(12) United States Patent
Meyer

(10) Patent No.: US 6,942,087 B2
(45) Date of Patent: Sep. 13, 2005

(54) CONVEYOR SYSTEM AND METHOD FOR TRANSFERRING STACKS OF PAPER OR THE LIKE TO A DISCHARGE CONVEYOR

(75) Inventor: Axel Meyer, Bad Urach-Hengen (DE)

(73) Assignee: Bielomatik Leuze GmbH & Co. KG (DE)

( * ) Notice: Subject to any disclaimer, the term of this patent is extended or adjusted under 35 U.S.C. 154(b) by 0 days.

(21) Appl. No.: 10/397,128

(22) Filed: Mar. 26, 2003

(65) Prior Publication Data

US 2003/0183486 A1 Oct. 2, 2003

(30) Foreign Application Priority Data

Mar. 28, 2002 (DE) .......................................... 102 14 684

(51) Int. Cl.[7] ............................................... B65G 25/00
(52) U.S. Cl. .................... 198/427; 198/436; 198/468.2; 198/468.9; 414/793.4; 414/790.2
(58) Field of Search ................................. 198/427, 436, 198/429, 468.01, 468.2, 468.3, 468.9, 547, 470.1; 414/790.2, 789.9, 789.6, 790.6, 796.9

(56) References Cited

U.S. PATENT DOCUMENTS

| | | | |
|---|---|---|---|
| 4,599,025 A | * | 7/1986 | Borsuk et al. ........... 414/793.4 |
| 4,621,725 A | * | 11/1986 | Rutter ........................ 198/436 |
| 5,233,815 A | | 8/1993 | Kroger et al. |
| 5,411,391 A | | 5/1995 | Albrecht et al. |
| 5,536,357 A | * | 7/1996 | Kovacs ..................... 198/470.1 |
| 5,829,300 A | * | 11/1998 | Sova ....................... 198/468.2 |

FOREIGN PATENT DOCUMENTS

| | | |
|---|---|---|
| DE | 93 06 508 U1 | 8/1993 |
| DE | 44 15 047 A1 | 11/1995 |

\* cited by examiner

*Primary Examiner*—James R. Bidwell
(74) *Attorney, Agent, or Firm*—Akerman Senterfitt

(57) ABSTRACT

The conveyor system (11) is used for transferring rows or large cycles (66) of sheet stacks (12) from the stacking station (20) of a paper converting machine, e.g. a small format cross-cutter to several parallel-running discharge conveyor belts (24, 25). For this purpose grippers or tongs (48) are provided, which are guided on gripper supports (39) and which can draw the stacks (12) from stacking station (20) via conveyor belts (24, 25). For each stacking position (21) there are two grippers (48, 48a), which in each case alternatively grip and transfer a stack, whilst the other gripper performs the return movement and passes into its waiting position upstream of the stacking station.

24 Claims, 8 Drawing Sheets

CONVEYOR SYSTEM AND METHOD FOR TRANSFERRING STACKS OF PAPER OR THE LIKE TO A DISCHARGE CONVEYOR

BACKGROUND OF THE INVENTION

The invention relates to a conveyor system for stacks of paper or the like formed from sheet layers and a method for transferring such stacks between a supply station and a discharge conveyor.

EP 465 916 B describes such a conveyor system and a method. It is used in installations where stacks of flat materials are juxtaposed in rows, e.g. in so-called small format cross-cutters, which produce from paper webs stacks of use format sheets, e.g. copy paper packs. The stacks arriving in juxtaposed manner in a row are transferred in the conveyor system to discharge conveyors, which run at right angles to the supply direction to the machine. The individual rows are connected to one another therein, so that the individual stacks can be separated to a predetermined spacing and in this way generally pass to packing machines.

EP 465 916 B describes an installation having in a discharge station two substantially parallel discharge conveyor sections on which the stack rows can be placed as desired. During normal operation this offers the advantage that the usually very large output of the manufacturing machine for the stacks can be distributed over several packing sections. The possibility also arises in the case of a problem or fault in one of the packing sections, as desired, only to supply one of the discharge conveyor sections with an optionally reduced machine capacity, but without stopping the machine.

Building up on this principle, EP 514 783 B describes a dividing up of the gripper row, which grips the stack row, in the centre, so that in each case one part of the stack row can be placed on each of the two discharge sections.

OBJECT OF THE INVENTION

The object of the invention is to further improve the conveyor system and the method according to EP 465 916 B and in particular in the case of great flexibility of operation to avoid dead times resulting from transfer, there by ensuring a troublefree transfer sequence, even at high operating speeds.

SUMMARY OF THE INVENTION

This object is achieved by a conveyor system in which with each stacking position is associated a gripper pair of two grippers which are movable independently of one another and which are operable for gripping or releasing the stack. This makes it possible for in each case one of the grippers of the pair to be moved into a position in which it can grip or seize the next stack, whilst the other gripper of the pair is still in engagement with the preceding stack, positions same over the discharge conveyor section and finally releases it. Therefore due to the fact that in each case one gripper of the pair is already performing the return movement when the other is still pulling or positioning a stack row, for transferring from the stacking position to the discharge conveyor sections is available virtually all the time required for stack formation or the stack supply. This can be relatively short time, because as a result of high operating speeds and the fact that working takes place in multilayer manner, small format cross-cutters can produce numerous stacks every minute.

Although both the grippers of a pair are supposed to be able to pass one another in collision-free manner along the transfer direction, they can be constructed in such a way that they in each case centrally grip the stacks, so that during transfer there is no turning tendency on the stacks. This can e.g. be brought about by a corresponding vertical displacement in the travel positions.

The gripper pairs can in each case be placed on a common gripper support having guides for the same. They are in each case movable independently of one another by a longitudinal drive, which can e.g. be constructed as a revolving pulling strap. For the movement of the individual fingers of each gripper into the gripper slides or carriages running on the guides can be integrated gripping drives, e.g. linear drives, pneumatic or hydraulic cylinders.

In order to be able to then place a stack row on the discharge conveyor further removed from the stacking position, the upstream conveyor section in the transfer direction can be lowered and bridged by a transfer bridge. It is then possible to pull the next stack row onto the second conveyor, whilst the first conveyor is already moving the preceding stack row in the discharge direction. Thus, complete stack rows can be alternately placed on two or, which is also possible, several mutually parallel conveyor sections, in which the conveyor sections closer to the stacking position can be lowered and/or bridged.

It is also possible to divide up a jointly gripped stack row over two conveyor sections. According to the invention this takes place in that said stack row is jointly gripped by corresponding grippers of the gripper pair forming a gripper group and which are jointly moved in the transfer direction. However, they can be opened individually or as a partial group, so that in each case part of a stack row can be deposited on the different discharge conveyor sections. Besides an e.g. 50% division of a stack row, a different division pattern could be used, e.g. the deposition of every second stack on each of the stack rows, which in certain circumstances can lead to an evening out of the stack flow on the conveyor sections and a corresponding shortening of the mechanism for connecting the stack rows to one another.

The return of in each case one of the two grippers of a pair to the stacking position, i.e. the empty return transport, can take place in a transfer position where both gripping fingers are raised in such a way that they can pass over and beyond the stacks transferred by the other gripper of the pair.

These and further features can be gathered from the claims, description and drawings and the individual features, both singly or in the form of sub-combinations, can be implemented in an embodiment of the invention and in other fields and can represent advantageous, independently protectable constructions for which protection is hereby claimed. The subdivision of the application into individual sections and the subheadings in no way restricts the general validity of the statements made thereunder.

BRIEF DESCRIPTION OF THE DRAWINGS

An embodiment of the invention is described in greater detail hereinafter relative to the attached drawings, wherein show.

DESCRIPTION OF A PREFERRED EMBODIMENT

FIGS. 1 to 10 show in a highly diagrammatic representation form a conveyor system 11 for stacks 12 formed from sheet layers.

Figure 16:
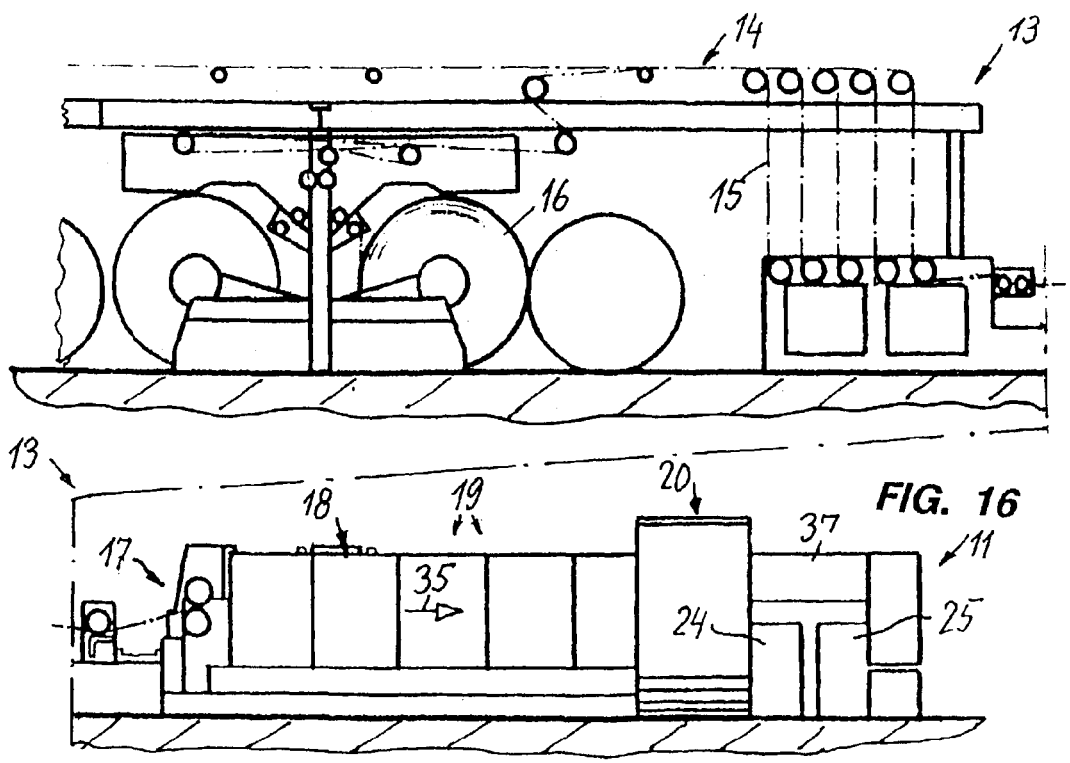
FIG. 16 A diagrammatic partial view of a paper converting machine containing the conveyor system.

The conveyor system 11 is positioned close to the end of a paper converting machine 13 shown in FIG. 16. In the embodiment it is a matter of a small format cross-cutter containing pull-off rolls 14 for five paper webs 15, which in each case come from a large paper reel 16 and which are jointly worked in superimposed manner. A slitter 17 slits the paper webs 15 in waste-free manner into format-maintaining longitudinal strips, which are then cut with a cross-cutter 18 to the corresponding format and are transferred into further stations 19 in a scaled sheet flow, checked, separated through the discharge of faulty sheets and finally collected in a stacking station 20 to sheet stacks of the desired height (e.g. 500 sheets). Corresponding to the number of blanks, i.e. juxtaposed stacks cut from a paper web width, numerous stacks 12 are formed in the stacking station and are juxtaposed in a stacking row 66 in corresponding stacking positions 21.

Thus, the stacking station 20 with the row of juxtaposed stacking positions 21 forms a supply station 22 for the conveyor system 11, which serves to transfer the stacks 12 to a discharge conveyor 23, which has two parallel discharge conveyor sections 24, 25.

In the represented embodiment there are two discharge conveyor sections 24, 25, which extend to the same side (to the right) and on each end have a not shown packing device for the stacks. However, it is also possible to have more than one conveyor section and/or to allow it to pass in T-shaped manner to both sides, although the present arrangement saves more space. The discharge conveyor comprises belt conveyors driven by drives 61, e.g. controllable electric motors.

Figure 1:
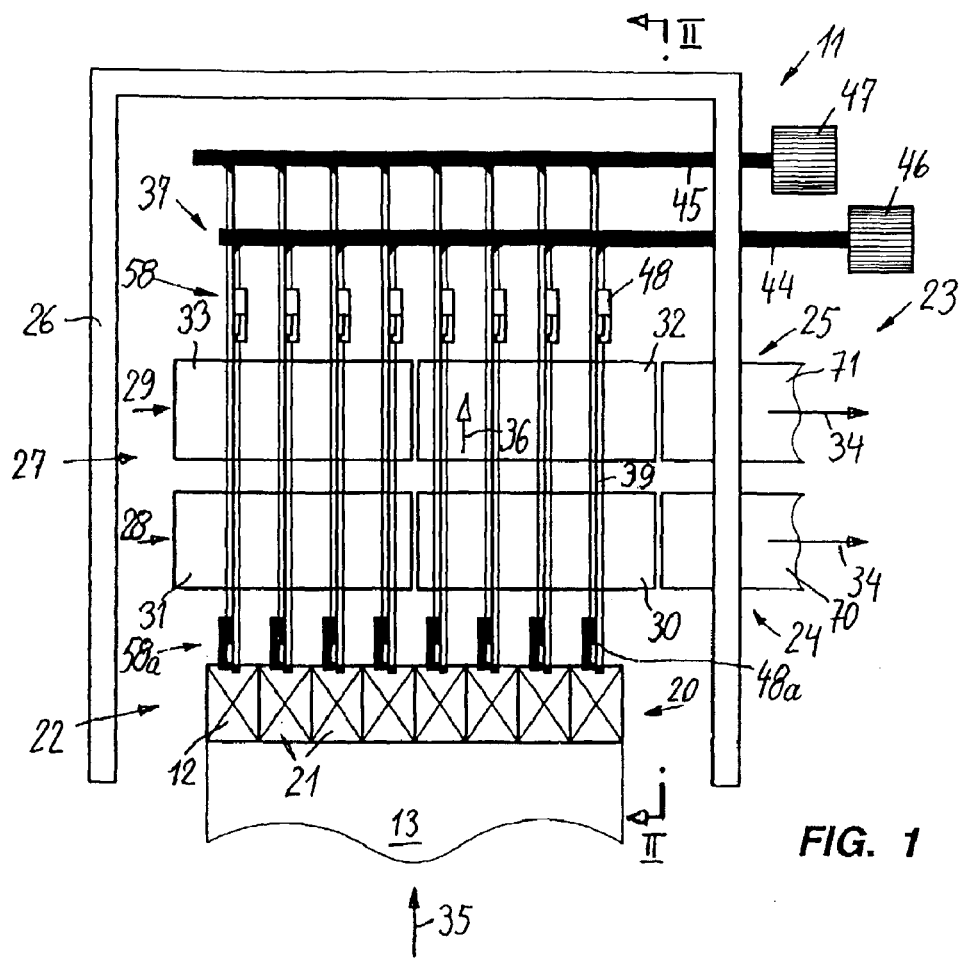
FIG. 1 A diagrammatic plan view of a conveyor system according to the invention.

The conveyor system surrounded by an intimated frame 26 encloses a transfer station 27 into which extends the discharge conveyor 23. In the vicinity of the transfer station it has transfer positions 28, 29 on both conveyor sections 24, 25. In FIG. 1 they are subdivided into two independently drivable partial conveyor sections 30, 31, 32, 33. Following on to the partial conveyor sections are provided conveyor belts 70, 71 for conveying on in the discharge direction and which are also referred to as accumulation conveyors.

The discharge direction 34 of the discharge conveyor is positioned transversely, preferably at 90ø to the supply direction 35 in which the stacks are supplied by the machine 13 (cf. FIGS. 1 and 16). This supply direction coincides with the transfer direction 36 with which the transfer conveyors 37 place the stacks 12 in the transfer positions 28, 29 on the discharge conveyor sections 24, 25.

Figure 3:
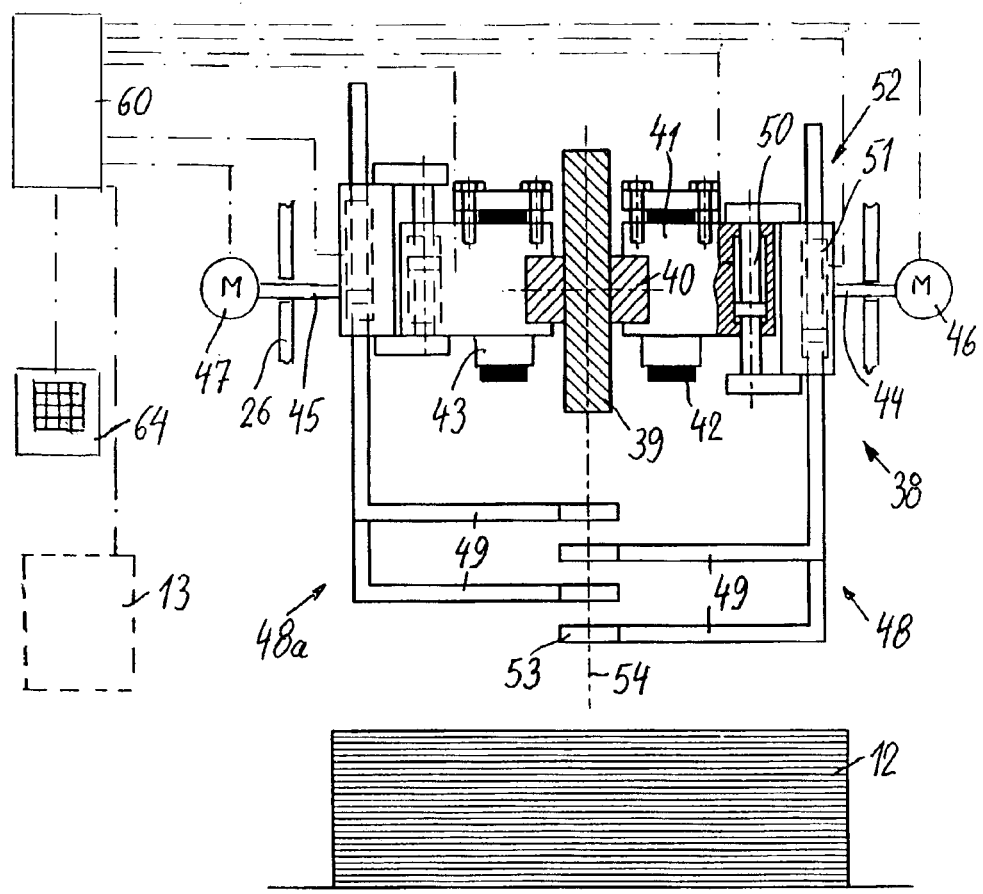
FIG. 3 A diagrammatic cross-section through a gripper support for a gripper pair.
Figure 4:
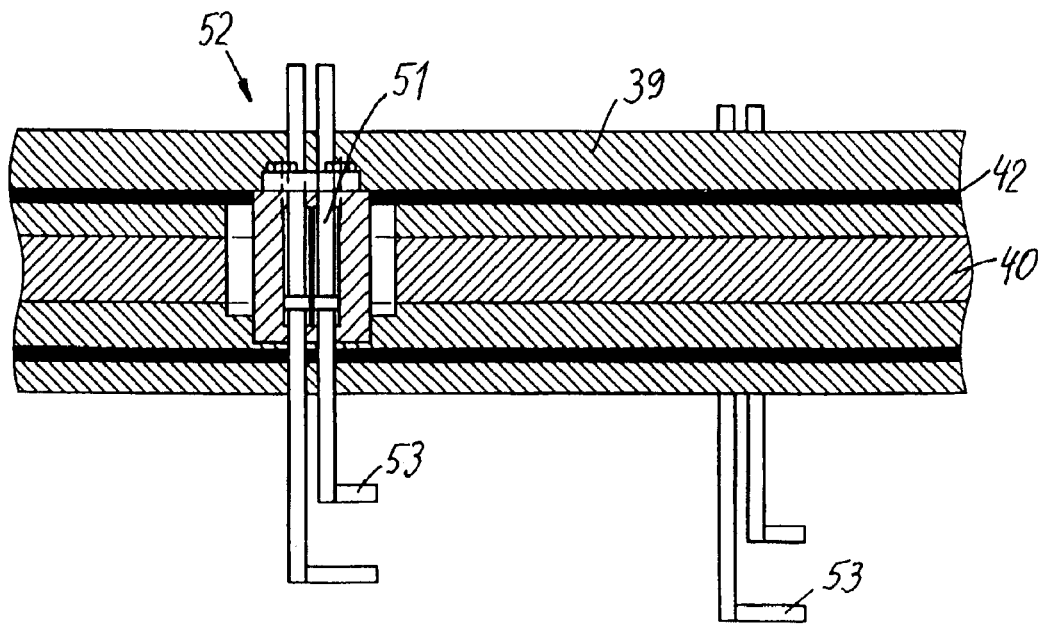
FIG. 4 A side view of the gripper support of FIG. 3.

The discharge conveyor 37 contains for each stacking position 21 a gripper pair 38, which is mounted so as to move backwards and forwards in the transfer direction on a common gripper support 39 (FIGS. 3 and 4).

FIG. 3 shows the gripper support 39 to which are fitted on either side guides 40, which can be guide rails, but also spherical guides or other linear guides. Gripper slides or carriages 41 run on the latter. In the longitudinal direction they are driven independently of one another, namely by means of tension elements 42 in the form of revolving straps or chains, which run round guide or drive wheels 43, which are driven by means of in each case a drive shaft 44, 45 by drive motors 46, 47 (cf. also FIGS. 1 and 2).

To each of the gripper carriages 41 is fitted a gripper 48 with two vertically movable gripper fingers 49. With each gripper is associated a pneumatic or hydraulic movement cylinder 50 for the raising and lowering device of the complete gripper 48, i.e. both gripper fingers together and in particular and as can be more particularly gathered from FIG. 4 there are individual movement cylinders 51 for each gripper finger 49. In the case of corresponding control, the latter could optionally also take over the task of the common cylinder 50. These three cylinders, which are supplied by movable hoses or the like with compressed air or hydraulic fluid, form the gripper actuation 52 for each gripper. Both grippers 48, 48a of a gripper pair 38 are constructed in principle identically, but are homologous to one another. The gripper fingers 49 of both associated grippers are double bent, so that their gripper tips 53 are located in a vertical middle plane 54 through the support 39. They are controlled so as to be movable longitudinally in collision-free manner (cf. FIGS. 3 and 4).

Figure 2:
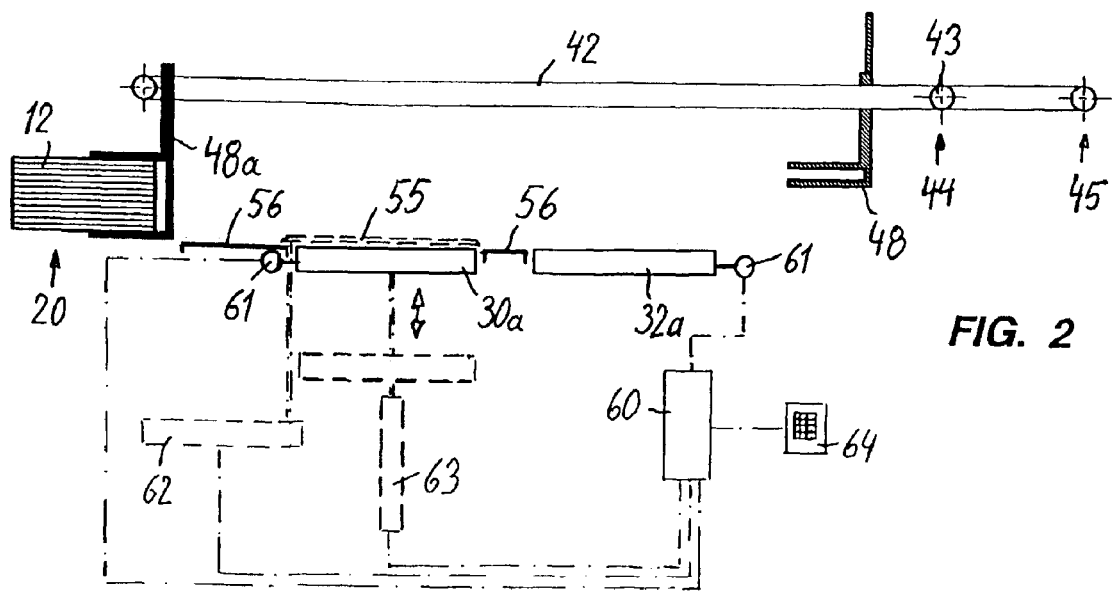
FIG. 2 A diagrammatic sectional view along line II—II in FIG. 1.

The grippers of the juxtaposed gripper pairs (eight in the embodiment) in each case arranged on the same side of the support 39 in each case form a gripper group 58, 58a, which consequently in each case comprise eight grippers 48, 48a. Each of the gripper groups has its own drive 44, 46 or 45, 47, which can e.g. be successively positioned in displaced manner, as shown in FIGS. 1 and 2. The gripper actuations 52 are also separately controllable for both gripper groups 58, 58a and are preferably also independent of one another within the individual groups.

FIG. 2 shows in broken line form an addition for the procedure according to FIGS. 11 to 15, where the discharge conveyor sections 24, 25 are not centrally divided, but are instead cohesive over the entire length of the transfer positions 28, 29. The conveyor 30a closest to the stacking station 20 can be lowered by somewhat more than the intended stack thickness and can be bridged by a transfer bridge 55 in such a way that a stack 12 can be drawn over it, even if there is still a stack on the lowered discharge conveyor section 24. In FIG. 2 and the following drawings of this type the grippers are shown in such a way that they grip a large part of the stack. However, in practice they only clamp the region of the front edge, so that the remainder of the stack can be pulled or dragged on the cover table or plates 56 provided between the stacking station and the conveyor sections or over the transfer bridge 55. The bottom of the stacking boxes in which the stacks 12 are formed, the cover tables 56, the transfer bridge 55, the conveyors 30 to 33 and the conveyor 38 in the lifting position are at one level. The transfer bridge 55 can be in multipart, e.g. telescopic form and can, as desired, be inserted and extended by a not shown mechanism. Details of the construction and the drive can be gathered from EP 465 916 B, to which express reference is made here.

The drive and control of the conveyor system, which is on the one hand dependent on the operating cycle and speed of the paper converting machine 13 and on the other controls the operating procedure of the discharge conveyor 23, can take place in different ways. It would fundamentally be possible to have a mechanical control using changeover gears and the like, but an electric control, which can act on pneumatic or hydraulic drive members, is more advantageous. The precise path and cycle control can preferably take place using electric stepping motors, linear motors, etc.

The block diagram of FIGS. 2 and 3 diagrammatically shows the control connections. The control takes place by a common control device 60, whose main part is a microprocessor, which receives signals from and supplies signals to the individual drives. These consist of the drive motors 46, 47 for the gripper movement in the transfer direction, the movement cylinders 50, 51 for the individual grippers 48, 48a or their pneumatic or hydraulic control, drives 61 for the individual partial conveyors 30 to 33 and the further extending conveyor sections 24, 25 of the discharge conveyor 23 and optionally a sliding drive 62 for the transfer bridge 55, which for space saving reasons can also be split, and a lifting drive 63 for the conveyor or conveyors in the vicinity of the transfer position 28. The control device 60 receives its signals also from the paper converting machine 13 and from an input device 64 enabling the different functions to be initiated. This could also be directly connected to other machine groups or functions, e.g. for indicating an accumulation in a packing unit and therefore bring about function reversals.

FIGS. 1 and 2, as well as 5 to 10 show successive method steps in an operation which can be referred to as split large cycle production. In all the representations (FIGS. 1, 2 and 5 to 15) the grippers 48, 48a are shown in solid black form when they are in their gripping position, i.e. have gripped a stack 12, whereas they are shown with normal border lines or in hatched form when "empty".

FIG. 1 shows the gripper group 58a (in each case right-hand gripper 48a of each gripper pair 38) in the fetching position and it has gripped a row 66 of juxtaposed stacks 12 which can also be referred to as large cycle. Each gripper 48a centrally seizes the stack between the gripper tips 53 of its two gripper fingers 49 and clamps the leading edge thereof. During this operation the gripper group 58 with the grippers 48 is in an end position at the opposite end of the gripper support 39, also beyond the outer discharge conveyor section 25, as shown in FIG. 2.

Figure 5:
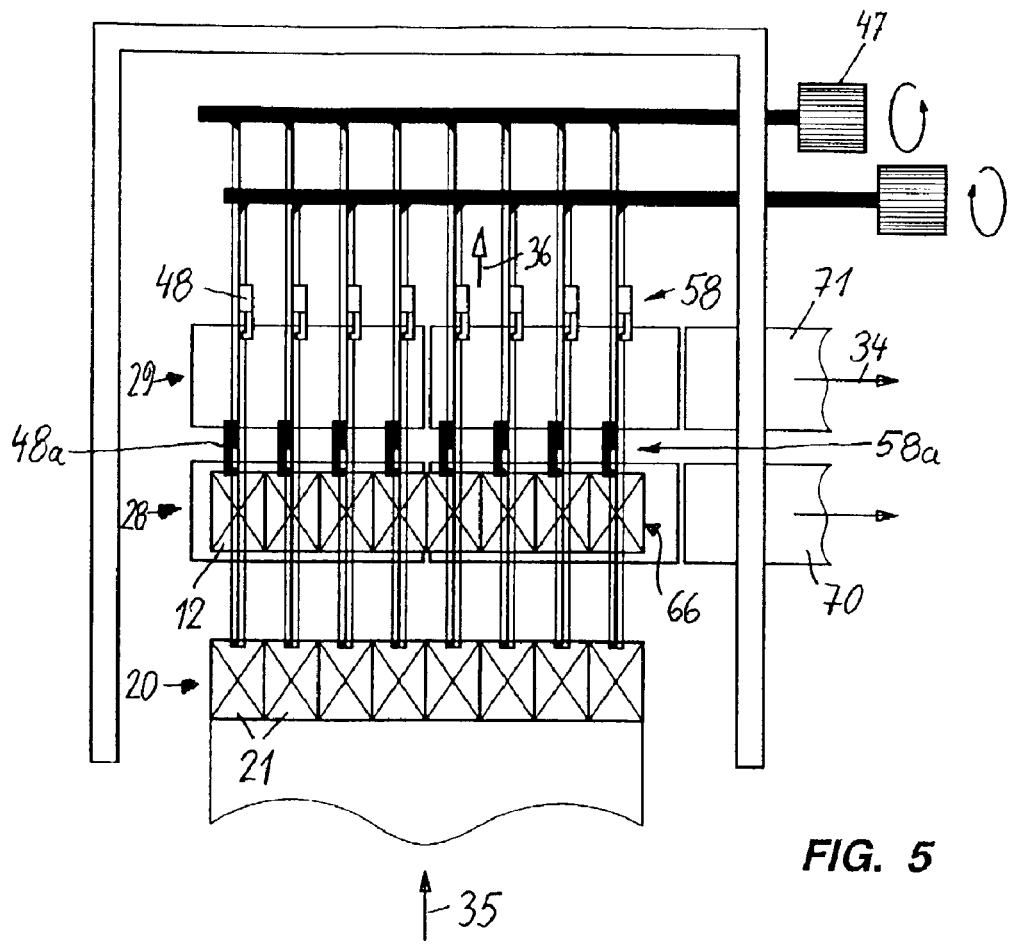
FIGS. 5/6, 7/8 and 9/10 In each case a plan view and section corresponding to FIGS. 1 and 2 of different method steps for stack transfer.
Figure 6:
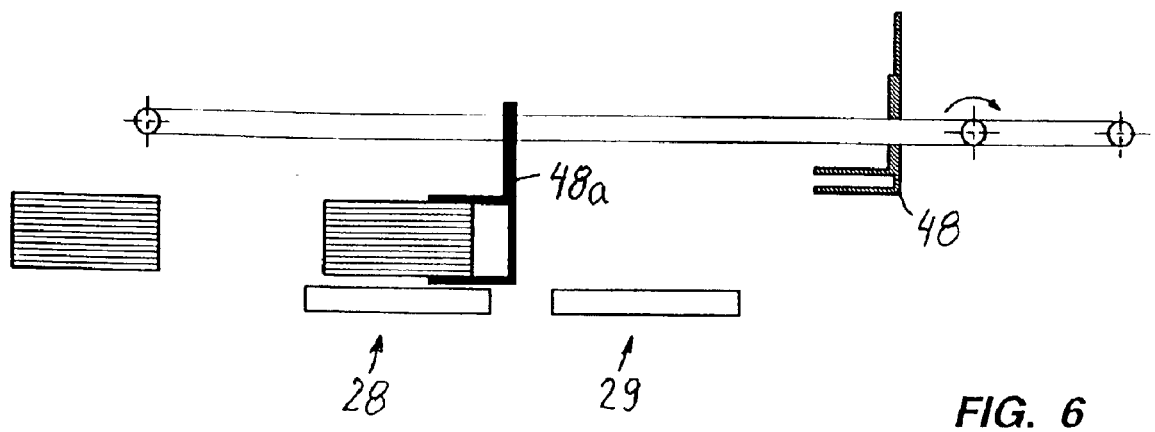

FIG. 5 shows that by putting into operation the drive 47 belonging to the gripper group 58a, all the grippers 48a of said group are moved in the transfer direction 36 and consequently the stack row 66 with stacks 12 has been drawn into the transfer position 28.

Figure 7:
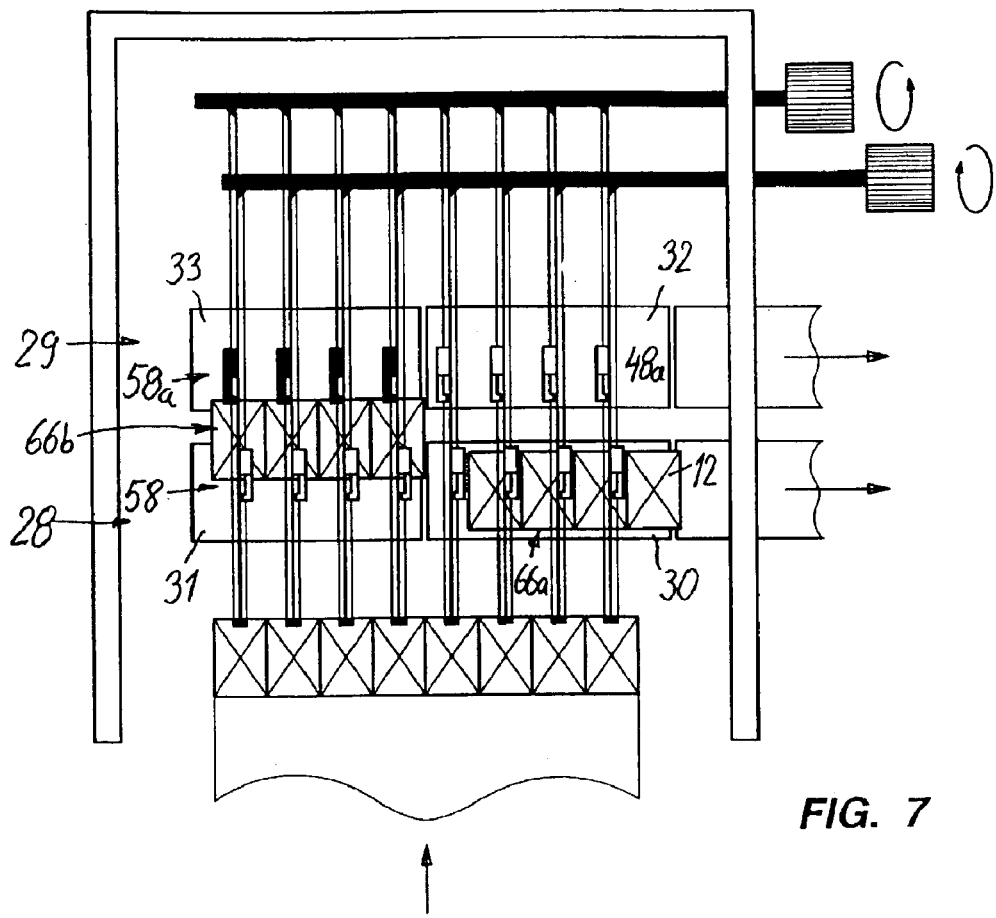

In this position by means of a control signal from the control device 60 part of the grippers of gripper group 58a is opened, as can be gathered from FIG. 7. Therefore the partial stack row 66a with the four right-hand stacks 12 remains on the partial conveyor 30 in the transfer position 28, whereas the partial stack row 66b with the left-hand four stacks 12 is drawn by the still closed grippers further towards the partial conveyor belt 33 in the transfer position 29. As soon as the first partial row 66a has been deposited on the partial conveyor 30 it can be started up in the discharge direction 34, so that the first half of the stack is discharged. Due to the subdivision of the discharge conveyor section 24 into partial conveyor sections 30, 31 said discharge can commence whilst the left-hand partial row 66b is still in the transfer position 28, i.e. on the then still stationary partial conveyor belt 31.

Figure 8:
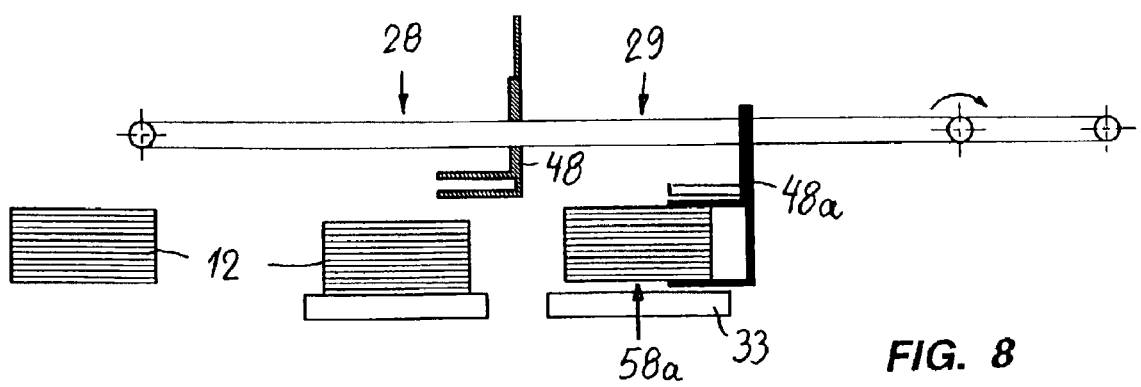

FIG. 8 shows a somewhat further advanced operating phase, in which the gripper group 58a has engaged the left-hand partial stack row 66b still gripped by it onto the partial conveyor belt 33 in the transfer position 39, whilst the four left-hand grippers 48a are opened.

Figure 9:
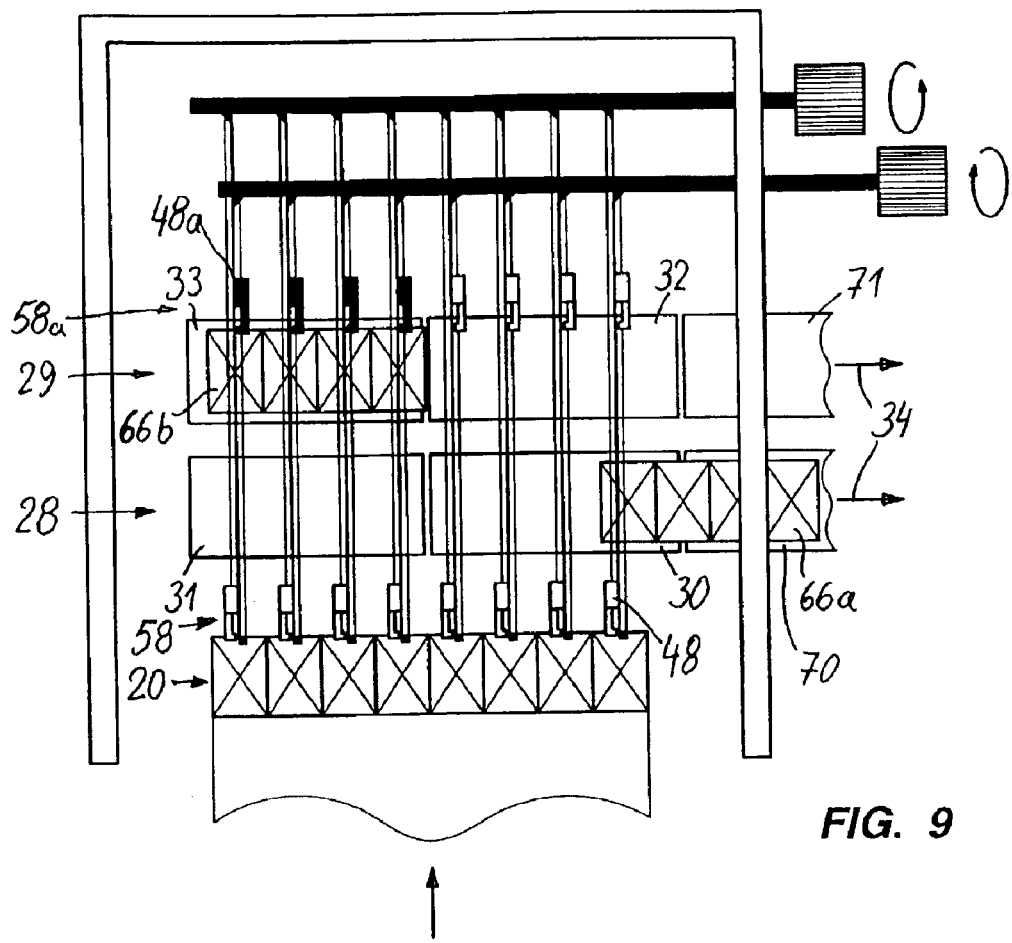

During these method steps the gripper group 58 moves from its position according to FIG. 1 continuously towards the acceptance position, i.e. the stacking station 20, which is reached in FIG. 9. The grippers of said group 58 have passed both the grippers of group 58a and also the stacks by running over the latter, because they were brought by the movement cylinder 50 into a position in which they passed between the gripper fingers of the other group, i.e. in collision-free manner. For this purpose the grippers are brought into a substantially closed position.

FIG. 9 shows the left-hand partial stack row 66b on the partial conveyor belt 33 in the transfer position 29. Its grippers 58a are now opened, so that the partial stack row by putting into operation the discharge conveyor section 25, including the partial conveyors 32, 33, is moved in the discharge direction 34. In the meantime the right-hand partial stack row 66a has almost left the transfer station 27 and continues on the conveyor belt 70 of the discharge conveyor section 24. This part of the discharge conveyor forms a so-called accumulation conveyor, where through the reduction of the speed of the preceding partial stack row or increasing the speed of the partial stack row 66a with respect thereto the individual rows can be uninterruptedly connected to one another, so that they can be subsequently separated to a constant spacing by a faster moving conveyor belt. The same takes place for the partial stack row 66b on discharge conveyor section 25.

Figure 10:
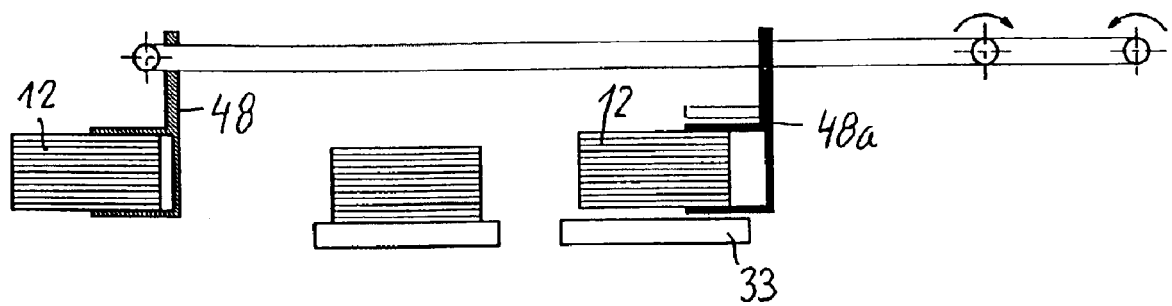

During this working cycle a new stack row 66 has formed in stacking position 20 and the gripper group 58, which optionally waited in a waiting position upstream of said stack row for the completion of the stack, has been moved up to the stack row and starts to grip the same, as indicated in FIGS. 9 and 10. The grippers 48a which have been released from the partial stack row 66b, then return to the end position shown in FIGS. 1 and 2, so that the cycle can recommence, but with the in each case different gripper group.

It is clear that in this case there is an alternating operation, in which both gripper groups in each case transfer a stack row 66 in transfer station 27 to the discharge conveyor 23. Immediately following the deposition of the final partial stack row 66d, the gripper group 58 is ready for taking over a stack at stacking station 20. Through avoiding the dead time which would otherwise be necessary for returning the grippers again, not only is a higher operating speed and shorter cycle time possible, but the transfer can take place more carefully and with reduced accelerations and speeds of transfer. This avoids damage to the stacks, their surfaces and their alignment.

Through the use of in each case two partial conveyors for a discharge conveyor section in the transfer station 27 it is possible to commence with the discharge of the partial stack row 66a whilst the partial stack row 66b is still in the stacking position 29, i.e. is located over the partial conveyor 31. However, on obviating this, it is also possible to obviate partial conveyor arrangement and in the vicinity of the transfer station is provided a single conveyor belt for transfer positions 28, 29. In this case it is also more easily possible, as desired, to have random divisions of stack rows, e.g. a division in 5:3 stacks in the embodiment shown. This is possible through an individual control of gripper actuation, although the individual gripper groups are always moved jointly along the transfer direction. In this way it would be possible to take account of the different operating speeds of packing machines and the like.

If one of the discharge conveyor sections is subject to an accumulation, it is easily possible to place the entire stack row 66 on one of the discharge conveyor sections, i.e. in transfer positions 28 or 29 and jointly discharge the same. For this it is merely necessary to have a control pulse, which can be supplied automatically or via the input device 64.

FIGS. 11 to 15 illustrate the operation in which in general in each case a complete stack row 66 is gripped by a gripper group and jointly discharged on in each case one conveyor section.

Figure 11:
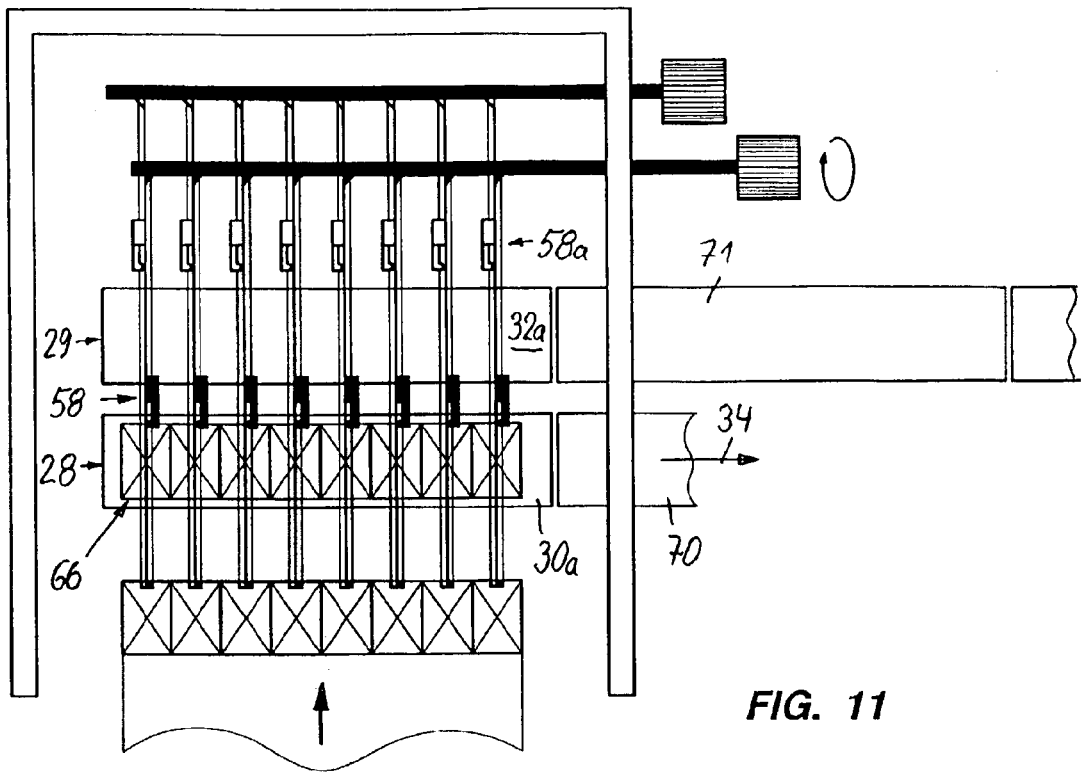
FIGS. 11 to 15 In each case in diagrammatic plan view a system with a modified operating procedure.

FIG. 11 shows that the gripper group 58 has already gripped stack row 66 and has already drawn it onto conveyor 30a in transfer position 29. Said conveyor is cohesive over the entire transfer position 28, i.e. is not subdivided into partial conveyors and consequently also jointly driven.

Figure 12:
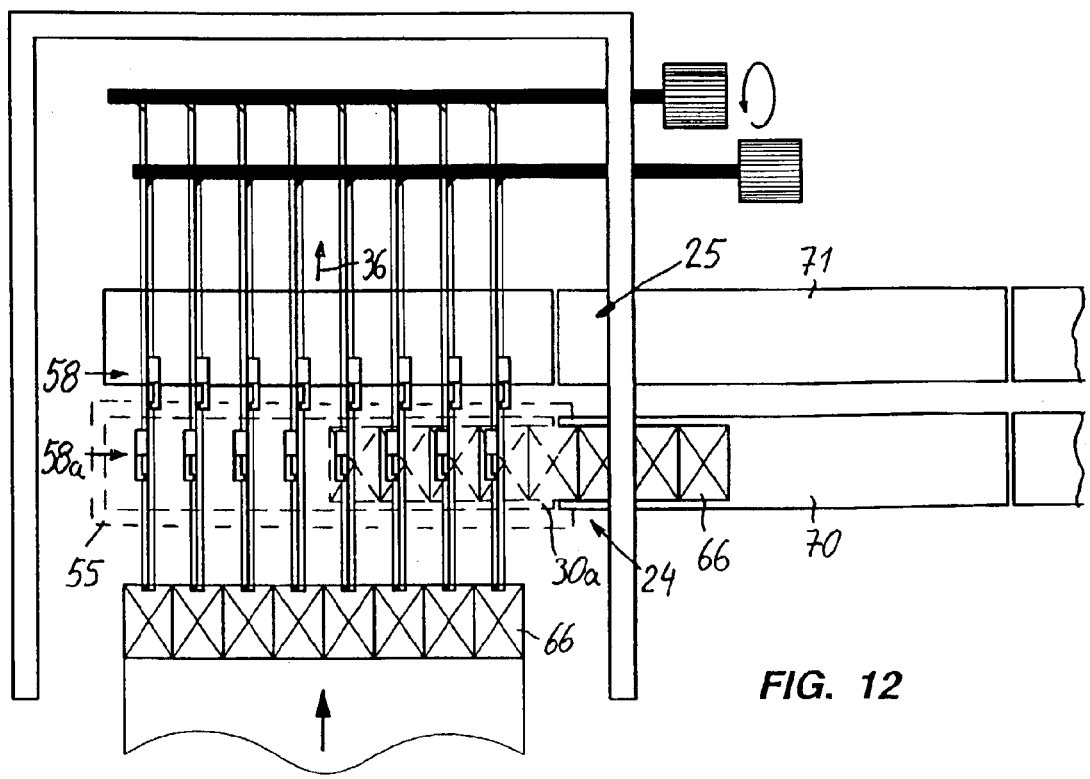
Figure 13:
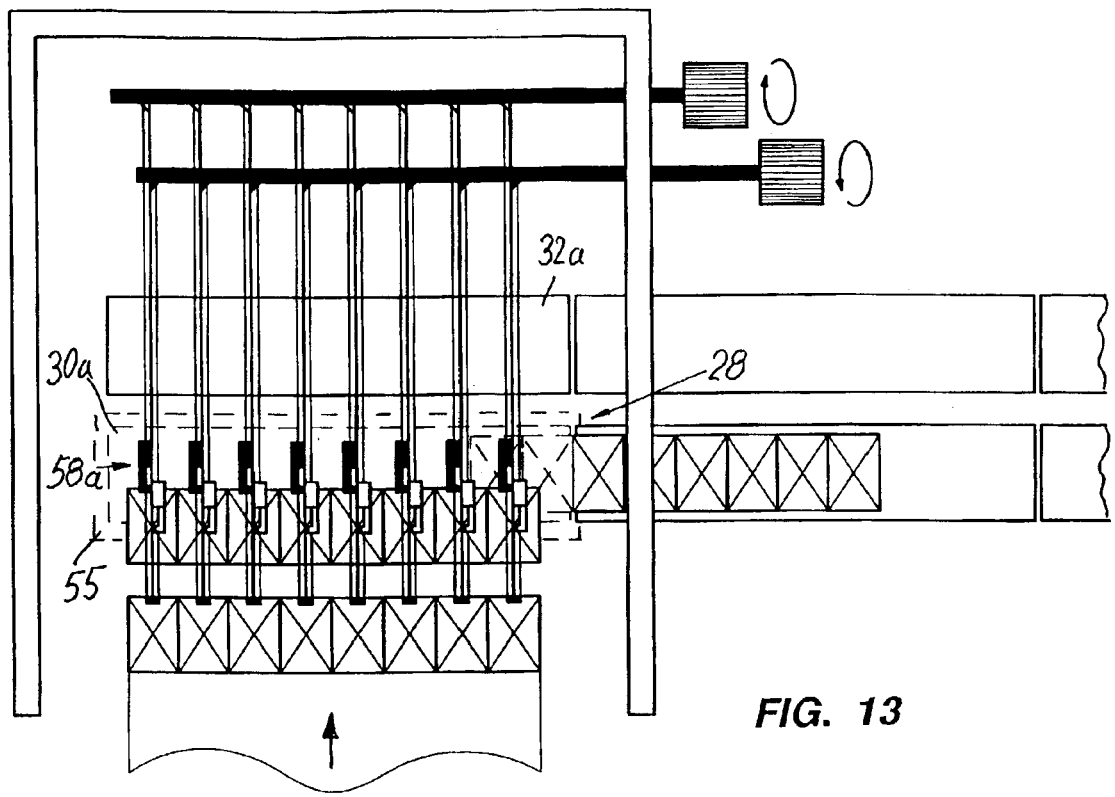

FIG. 12 shows that the grippers of group 58 have opened and released the stack row 66, so that it is now conveyed on conveyor belt 70 of discharge conveyor 25 from the transfer station in discharge direction 34. The broken line illustration of conveyor 30a indicates that it is now lowered and covered by the transfer bridge 55, so that the gripper group 58a which has in the meantime travelled back counter to the transfer direction 36 could grip the next stack row 66 and in FIG. 13 has already started to draw it on transfer bridge 55 over and beyond the stacking position 28, whilst below it the discharge of the preceding stack row 66 continues.

Figure 14:
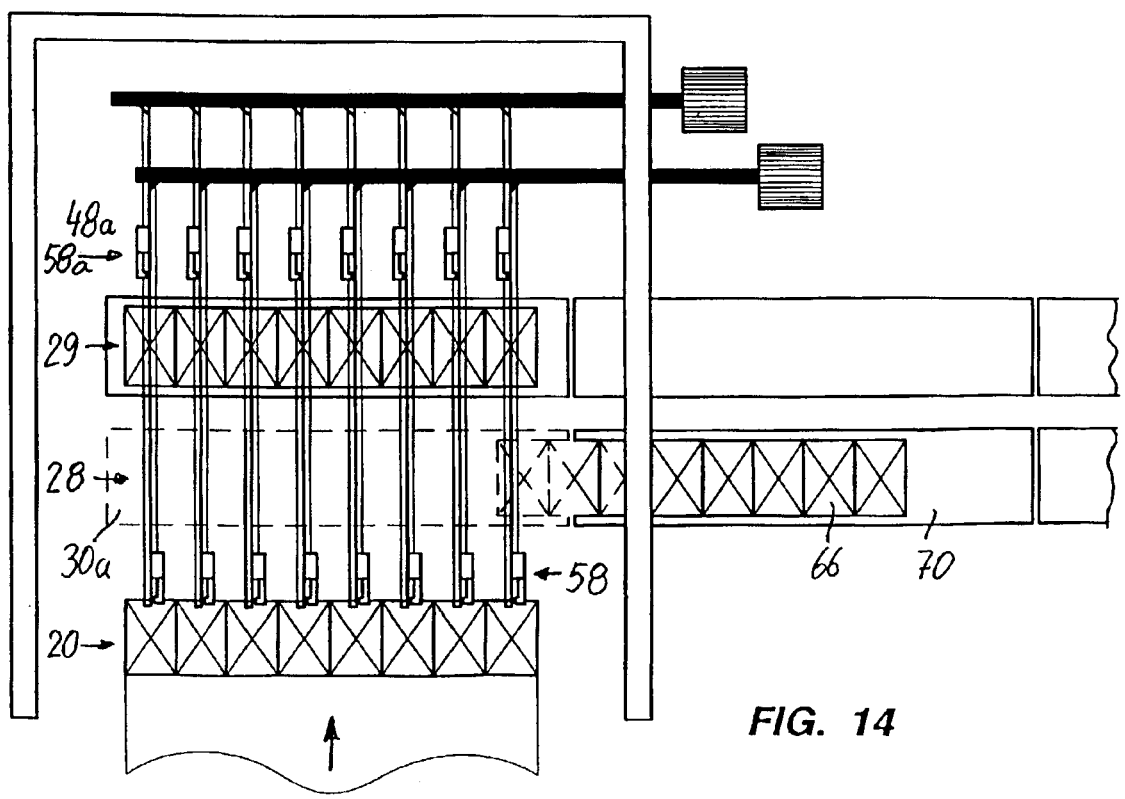

FIG. 14 shows the position in which the gripper group 58a has already placed stack row 66 on conveyor 32a in transfer position 29 and the grippers 48a are already in their "empty" rest position. In the meantime the gripper group 58 is already in the acceptance position at stacking station 20, so that it can immediately recommence with transfer when stack row 66 has left the transfer position 28 and the lowering conveyor 30a has again been raised to the transfer level.

Figure 15:
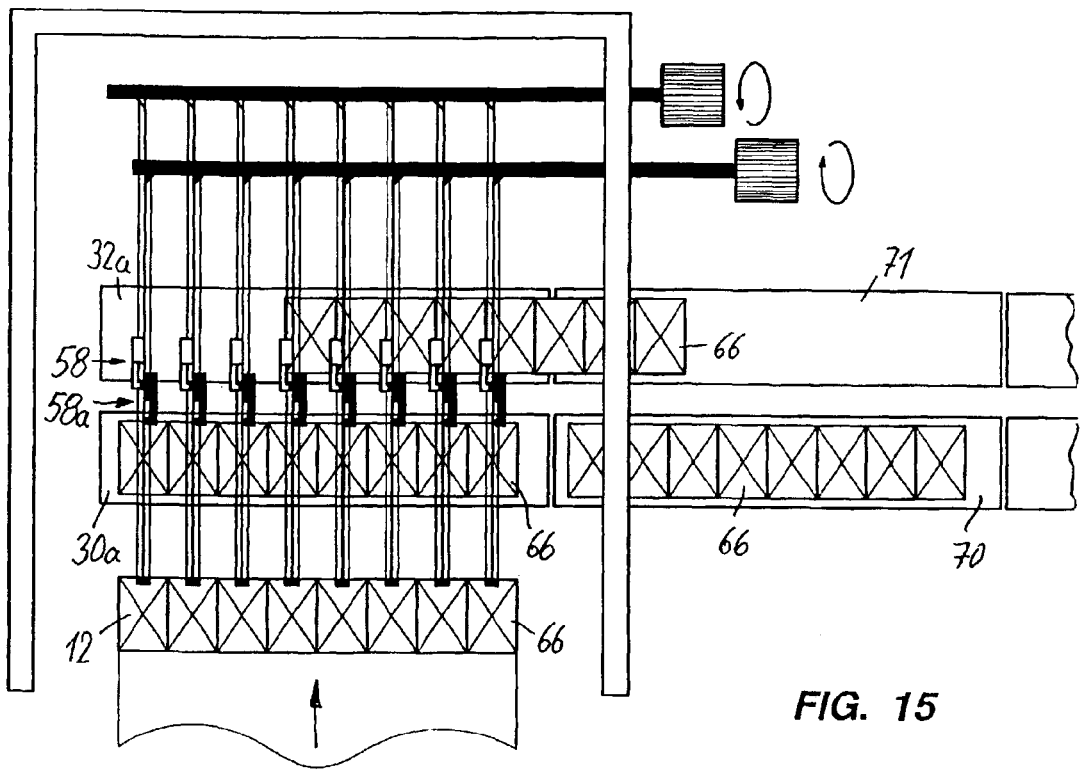

FIG. 15 shows a working position roughly corresponding to that according to FIG. 11, but where the gripper group 58a has already advanced further in the return direction. It can be seen that the individual stack rows 66 have been brought by the double gripper construction in close succession onto the discharge conveyor belts 70, 71, so that the gaps between the individual stack rows are closed without any problem.

Also with this construction and operation it is possible, if need be, to discharge the entire production of the paper converting machine 13 on a single discharge conveyor section, solely through the opening of the grippers in in each case the same transfer position.

Through avoiding dead times, the invention increases the time required for stack discharge. However, on further increasing the operating speed, due to stack acceleration through the discontinuously driven conveyors 30 to 33 and 30a, 32a, stacks can slide out of their precise alignment, particularly if smooth paper is involved. At this time the stacks are no longer seized by the grippers or tongs.

To solve this problem the entire gripper mechanism can be constructed in such a way that during the acceleration phase, i.e. on starting up the belt drives for the conveyors 30 to 33, 30a, 32a, it also runs for a short distance in the discharge direction 34, the grippers gripping the stacks still being closed. They would then only open when the first acceleration phase was ended. The gripper mechanism can then return to the starting position. This reciprocating movement, which could affect the entire transfer station frame 26, can be brought about by a mechanical or electrical drive coupled to the drive of the corresponding conveyor belts.

It is merely necessary to ensure by a corresponding control in said construction that the transverse movement of the grippers in the discharge direction only takes place when solely those grippers located on the conveyor to be started are closed. This solution also aids the troublefree sequence of transfer at high operating speeds.

What is claimed is:

1. A conveyor system for stacks of sheet material formed by sheet layers, comprising:
    a supply station, where there are several stacks in a stack row in juxtaposed stacking positions for transfer purposes,
    a discharge conveyor having at least two substantially parallel discharge conveyor sections conveying in at least one discharge direction,
    a transfer station into which the discharge conveyor partly extends and having transfer positions on each of the discharge conveyor sections
    and transfer conveyors with grippers, each gripper having upper and lower gripper fingers and being operable for gripping and releasing the stacks and movable in a transfer direction at right angles to the discharge direction, between the supply station and the transfer station, in order to deposit there the gripped and transversely conveyed stacks, and
    two of the grippers defining a gripper pair associated with each stacking position, and being movable independently of one another and operable for gripping or releasing one of the stacks.

2. A conveyor system according to claim 1, wherein the grippers of a gripper pair are provided on a common gripper support.

3. A conveyor system according to claim 1, wherein the grippers of the gripper pair are provided on either side of the common gripper support.

4. A conveyor system according to claim 1, wherein the grippers have gripping fingers for gripping the stacks centrally gripped by both grippers, but letting the grippers to pass one another in collision-free manner along the transfer direction.

5. A conveyor system according to claim 1, wherein the grippers have gripper drives for moving the gripping fingers transversely to the transfer direction.

6. A conveyor system according to claim 3, wherein the gripper support has on either side guides for the grippers, each gripper engaging a longitudinal drive.

7. A conveyor system according to claim 6, wherein the longitudinal drive is a revolving draw element.

8. A conveyor system according to claim 1, wherein the grippers, have a gripping position where they grip a stack, a release position which they assume before and after gripping, and an overtravel position, on which they are movably driven to pass in collision-free manner a stack located on one of the discharge conveyors.

9. A conveyor system according to claim 1, wherein at least one of the discharge conveyor sections is lowerable and can temporarily be bridged by a transfer bridge guiding the stacks over said conveyor section.

10. A conveyor system according to claim 1, wherein at least one of the discharge conveyor sections in the transfer station is divided into at least two partial conveyors which can be driven independently of one another.

11. A method for transferring stacks of sheet material formed by sheet layers between
    a supply station, in which several stacks in a stack row are provided for transfer in juxtaposed stacking positions, and
    a discharge conveyor, which has at least two substantially parallel discharge conveyor sections conveying in at least one discharge direction in a transfer station into which the discharge conveyor partially extends and transfer positions on each of the discharge conveyor sections, the method comprising the steps of:

gripping and releasing stacks using transfer conveyors with grippers operable and movable in a transfer direction at right angles to the discharge direction, between the supply station and the transfer station; and depositing at the transfer station the gripped and transversely conveyed stacks, wherein the grippers, in the transfer station, transfer the stacks of sheet layers between the supply station and the at least one discharge conveyor section and are moveable to clamp the stacks in synchronism with the discharge conveyor in the discharge direction, at least during a part of a starting phase of the discharge conveyor.

12. A method for transferring stacks of sheet material formed by sheet layers between a supply station, in which several stacks in a stack row are provided for transfer in juxtaposed stacking positions, and a discharge conveyor, which has at least two substantially parallel discharge conveyor sections conveying in at least one discharge direction in a transfer station into which the discharge conveyor partially extends and transfer positions on each of the discharge conveyor sections, the method comprising the steps of:

gripping and releasing stacks using transfer conveyors with grippers operable and movable in a transfer direction at right angles to the discharge direction, between the supply station and the transfer station; and depositing at the transfer station the gripped and transversely conveyed stacks, wherein two of the grippers associated with each stacking position, define a gripper pair, and are movable independently of one another and for gripping or releasing the stacks, wherein at least one of the discharge conveyor sections can temporarily be bridged by being lowered and by using a transfer bridge for guiding the stacks over the conveyor section, wherein at least one of the discharge conveyor sections in the transfer station is divided into at least two partial conveyors which can be driven independently of one another, the grippers having a gripping position where they grip a stack, a release position which they assume before and after gripping, and are movably drivable to pass in collision-free manner a stack located on one of the discharge conveyors.

13. A method for transferring stacks of sheet material formed by sheet layers between a supply station, in which several stacks in a stack row are provided for transfer in juxtaposed stacking positions, and a discharge conveyor, which has at least two substantially parallel discharge conveyor sections conveying in at least one discharge direction in a transfer station into which the discharge conveyor partially extends and transfer positions on each of the discharge conveyor sections, the method comprising the steps of:

gripping and releasing stacks using transfer conveyors with grippers operable and movable in transfer direction at right angles to the discharge direction, between the supply station and the transfer station; and depositing at the transfer station the gripped and transversely conveyed stacks, wherein stacks successively conveyed from each of the stacking positions are alternately and successively gripped, moved and deposited by different grippers of a gripper pair, each gripper of said gripper pair having upper and lower gripper fingers for gripping one of said stacks and each gripper pair being associated with only one of said stacking positions.

14. The method according to claim 13, wherein in each case one gripper of a gripper pair belongs to a gripper group of juxtaposed gripper pairs and each of the groups can be driven and operated independently of the other group in and counter to the transfer direction.

15. The method according to claim 14, wherein grippers within a group or an a subgroups of grippers, are operable independently of one another.

16. The method according to claim 13, wherein one of the grippers of a gripper pair makes a return movement counter to the transfer direction, whilst the other gripper of the pair is in engagement with a stack.

17. The method according to claim 13, wherein the grippers grip the stacks centrally, and are arranged to pass one another in collision-free manner along the transfer direction.

18. The method according to claim 14, wherein from the stacks of a stack row gripped jointly by a gripper group and drawn from the stacking positions, one partial stack row is placed on a first discharge conveyor sections and a further row is placed on a further discharge conveyor section.

19. The method according to claim 14, wherein the stacks of a stack row jointly gripped by a gripper group and drawn from the stack positions are deposited an alternating, successive manner on a first or further discharge conveyor section, and wherein the stack row to be placed on the further discharge conveyor section as conveyed on the first discharge conveyor section over and beyond the stack row, which is optionally lowered.

20. A method for transferring stacks of sheet material formed by sheet layers between a supply station, in which several stacks in a stack row are provided for transfer in juxtaposed stacking positions, and a discharge conveyor, which has at least two substantially parallel discharge conveyor sections conveying in at least one discharge direction in a transfer station into which the discharge conveyor partially extends and transfer positions on each of the discharge conveyor sections, the method comprising the steps of:

gripping and releasing stacks using transfer conveyors with grippers operable and movable in a transfer direction at right angles to the discharge direction, between the supply station and the transfer station; and depositing at the transfer station the gripped and transversely conveyed stacks, wherein stacks successively conveyed from each of the stacking positions are alternately and successively gripped, moved and deposited by different grippers of a gripper pair, and wherein at least one of the discharge conveyor sections can temporarily be bridged by being lowered and by using a transfer bridge for guiding the stacks over said conveyor section.

21. A method for transferring stacks of sheet material formed by sheet layers between
a supply station, in which several stacks in a stack row are provided for transfer in juxtaposed stacking positions, and
a discharge conveyor, which has at least two substantially parallel discharge conveyor sections conveying in at least one discharge direction in a transfer station into which the discharge conveyor partially extends and transfer positions on each of the discharge conveyor sections,
the method comprising the steps of:
gripping and releasing stacks using transfer conveyors with grippers operable and moveable in a transfer direction at right angles to the discharge direction, between the supply station and the transfer station; and
depositing at the transfer station the gripped and transversely conveyed stacks,
wherein stacks successively conveyed from each of the stacking positions are alternately and successfully gripped, moved and deposited by different grippers a gripper pair, and
wherein at least two partial conveyors of the discharge conveyor section in the transfer station are driven independently of one another.

22. A method for transferring stacks of sheet material formed sheet layers between
a supply station, in which several stacks in a stack row are provided for transfer in juxtaposed stacking positions, and
a discharge conveyor, which has at least two substantially parallel discharge conveyor sections conveying in at least one discharge direction in a transfer station into which the discharge conveyor partially extends and transfer positions on each of the discharge conveyor sections,
the method comprising the steps of:
gripping and releasing stacks using transfer conveyors with grippers operable and movable in a transfer direction at right angles to the discharge direction, between the supply station and the transfer station; and
depositing at the transfer station the gripped and transversely conveyed stacks,
wherein stacks successively conveyed from each of the stacking positions are alternately and successively gripped, moved and deposited by different grippers of a gripper pair, and
wherein in each case one gripper of a gripper pair with corresponding grippers of adjacent gripper pairs can be moved jointly as a gripper group in and counter to the transfer direction, but optionally some grippers, combined into at least one subgroup, are opened and/or closed independently of the others in the same gripper group.

23. A conveyor system for stacks of sheet material formed by sheet layers, comprising:
a supply station, where there are stacks collected for transfer purposes;
at least one discharge conveyor conveying in at least one discharge direction and being discontinuously drivable; and
at least one transfer conveyor with grippers operable for gripping and releasing the stacks and movable in a transfer direction at right angles to the discharge direction, between the supply station and the transfer station, in order to deposit there the gripped and transversely conveyed stacks,
wherein the grippers, which in the transfer station transfer the stacks of sheet layers between the supply station and the at least one discharge conveyor, are controllable to clamp the stacks and to be moved in synchronism with the discharge conveyor in the discharge direction, at least during a part of a starting phase of the discharge conveyor.

24. A conveyor system for stacks of paper formed by paper layers, comprising:
a supply station, where there are several stacks in a stack row in juxtaposed stacking positions for transfer purposes;
a discharge conveyor having at least two substantially parallel discharge conveyor sections conveying in at least one discharge direction;
a transfer station into which the discharge conveyors partly extend and having transfer positions on each of the discharge conveyor sections;
transfer conveyors with grippers operable for gripping and releasing the stacks and movable in a transfer direction at right angles to the discharge direction between the supply station and the transfer station, in order to deposit there the gripped and transversely conveyed stacks; and
a gripper pair comprising two grippers associated with each stacking position, movable independently of one another and operable for gripping or releasing the stacks,
wherein at least one of the discharge conveyor sections is lowerable and bridgeable temporarily by a transfer bridge guiding the stacks over said conveyor section,
wherein at least one of the discharge conveyor sections in the transfer station is divided into at least two partial conveyors which can be driven independently of one another, and
wherein the grippers have a supping position where they grip a stack, a release position which they assume before and after gripping, and an overtravel position in which they are movably driven to pass in collision-free manner a stack located on one of the discharge conveyors.

* * * * *

UNITED STATES PATENT AND TRADEMARK OFFICE
CERTIFICATE OF CORRECTION

PATENT NO. : 6,942,087 B2 Page 1 of 1
APPLICATION NO. : 10/397128
DATED : September 13, 2005
INVENTOR(S) : Meyer It is certified that error appears in the above-identified patent and that said Letters Patent is hereby corrected as shown below:

Column 1, line 43, replace "there by" with -- thereby --

Column 5, line 41, replace "t he" with -- the --

Column 7, line 46, replace "in in" with -- in --

Column 10, line 23, replace " or an a subgroups" with -- or a subgroup --

Column 10 line 40, replace "an alternating" with -- in alternating --

Column 12 line 51, replace "supping" with -- gripping --

Signed and Sealed this

Thirteenth Day of February, 2007

JON W. DUDAS
*Director of the United States Patent and Trademark Office*